(12) United States Patent
Urmston et al.

(10) Patent No.: US 12,054,290 B2
(45) Date of Patent: Aug. 6, 2024

(54) RIGID TEMPORARY REINFORCEMENT STRUCTURE

(71) Applicant: AIRBUS OPERATIONS LIMITED, Bristol (GB)

(72) Inventors: Peter Urmston, Bristol (GB); Christopher Morris, Bristol (GB); Jack Attwell, Bristol (GB); Alan Ellson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 257 days.

(21) Appl. No.: 17/388,605

(22) Filed: Jul. 29, 2021

(65) Prior Publication Data

US 2022/0097869 A1  Mar. 31, 2022

(30) Foreign Application Priority Data

Sep. 29, 2020 (GB) ..................................... 2015407

(51) Int. Cl.
*B64F 5/10* (2017.01)
*B23Q 1/03* (2006.01)
(Continued)

(52) U.S. Cl.
CPC ................ *B64F 5/10* (2017.01); *B23Q 1/03* (2013.01); *B23Q 3/00* (2013.01); *B25J 15/0019* (2013.01);
(Continued)

(58) Field of Classification Search
CPC ........ B23Q 3/063; B23Q 3/065; B25J 11/007; B25J 15/0019; B25J 15/0095; B64F 5/10; B64F 5/50
See application file for complete search history.

(56) References Cited

U.S. PATENT DOCUMENTS

| 4,995,146 A | 2/1991 | Woods |
| 8,634,950 B2 | 1/2014 | Simonetti et al. |

(Continued)

FOREIGN PATENT DOCUMENTS

| EP | 1254047 | 11/2002 |
| EP | 3 112 145 | 1/2017 |

(Continued)

OTHER PUBLICATIONS

Combined Search and Examination Report dated Mar. 12, 2021, 7 pages.

*Primary Examiner* — Tyrone V Hall, Jr.
(74) *Attorney, Agent, or Firm* — Nixon & Vanderhye P.C.

(57) ABSTRACT

A resilient component for attachment to a rigid temporary reinforcement structure, and a rigid temporary reinforcement structure for attachment to a resilient component are disclosed. The temporary reinforcement structure having one or more datum attachment features for releasably attaching the temporary reinforcement structure to corresponding datum attachment features of the resilient component, where the datum attachment features and the datum features of the resilient component have a common datum, and the temporary reinforcement structure is configured to rigidly support the resilient component during assembly of the resilient component to a structural assembly.

12 Claims, 9 Drawing Sheets

(51) Int. Cl.
- *B23Q 3/00* (2006.01)
- *B25J 15/00* (2006.01)
- *B64C 3/18* (2006.01)
- *B64C 3/28* (2006.01)

(52) U.S. Cl.
CPC .............. *B64C 3/187* (2013.01); *B64C 3/28* (2013.01); *B25J 15/0047* (2013.01)

(56) References Cited

U.S. PATENT DOCUMENTS

| | | |
|---|---|---|
| 9,880,545 B2 | 1/2018 | Fadlovich et al. |
| 10,146,202 B2 | 12/2018 | Skaggs et al. |
| 2018/0104777 A1 | 4/2018 | Tombe et al. |

FOREIGN PATENT DOCUMENTS

| | | | |
|---|---|---|---|
| EP | 3 249 482 | 11/2017 | |
| EP | 3268281 | 1/2018 | |
| EP | 3 533 716 | 9/2019 | |
| EP | 3533716 A1 * | 9/2019 | ............... B64F 5/10 |
| GB | 2526916 | 12/2015 | |
| WO | 01/058753 | 8/2001 | |
| WO | 2016/142907 | 9/2016 | |

* cited by examiner

RIGID TEMPORARY REINFORCEMENT STRUCTURE

CROSS RELATED APPLICATION

This application claims priority to United Kingdom (GB) Patent Application 2015407.6, filed Sep. 29, 2020, the entire content of which is hereby incorporated by reference.

FIELD OF THE INVENTION

The present invention relates to a resilient component for attachment to a rigid temporary reinforcement structure, a rigid temporary reinforcement structure for attachment to a resilient component, and a method of attaching a temporary reinforcement structure to a resilient component.

BACKGROUND OF THE INVENTION

An aircraft wing is typically assembled as a wing box construction comprising upper and lower covers sandwiching a structural frame comprising spanwise spars and chordwise ribs. The ribs are designed to support the covers in forming the outer aerodynamic wing profile, and in doing so transfer loads from the covers to the spars.

Each rib is designed to carry these particular loads whilst minimising its weight. The ribs include a rib web, and rib brackets (also referred to as rib feet and rib flanges) that connect the rib web to the spars and covers of the wing box. The webs of the ribs are typically relatively thin and as a consequence, prior to assembling the ribs into the wing box, the ribs are able to flex and bend. Any movement of each rib during assembly makes accurate positioning and assembly of the rib into the wing box more challenging. Accurate positioning of the rib is particularly important, as pilot holes or final assembly holes for a fastener to attach the rib to the wing box are formed only after the rib is positioned in its final assembly position. To counter these difficulties, a rigid temporary reinforcement structure, commonly referred to as a strongback, may be used to temporarily stiffen the rib during assembly to the rest of the wing box.

Various gauges and sensors are manually placed on or adjacent to the ribs in order to position and fasten each rib to the spars of the wing box. Manual setting gauges are used to position the ribs relative to attachment flanges of the spars, whilst magnetic through-thickness sensors—commonly known as through skin sensors (TSS)—manually placed inside the wing box in pilot/datum holes are used to navigate the drilling of fastener holes from outside the wing box.

Each of the ribs is installed manually, using a lifting device to manually manipulate and position the rib, in what is a labour intensive and time consuming process.

SUMMARY OF THE INVENTION

A first aspect of the invention provides a resilient component for attachment to a rigid temporary reinforcement structure, the resilient component having one or more datum attachment features for releasably attaching to corresponding datum attachment features of the temporary reinforcement structure, and one or more datum features for joining the resilient component to a structural assembly, where the datum attachment features and the datum features of the resilient component have a common datum, and the temporary reinforcement structure is configured to rigidly support the resilient component during assembly of the resilient component to a structural assembly.

A second aspect of the invention provides a rigid temporary reinforcement structure for attachment to a resilient component, the temporary reinforcement structure having one or more datum attachment features for releasably attaching the temporary reinforcement structure to corresponding datum attachment features of the resilient component, where the datum attachment features and the datum features of the resilient component have a common datum, and the temporary reinforcement structure is configured to rigidly support the resilient component during assembly of the resilient component to a structural assembly.

A third aspect of the invention provides a method of attaching a temporary reinforcement structure to a resilient component, comprising: providing a resilient component having one or more datum attachment features and one or more datum features, where the datum attachment features and the datum features of the resilient component have a common datum; providing a rigid temporary reinforcement structure having one or more datum attachment features; aligning one or more datum attachment features of the temporary reinforcement structure to corresponding datum attachment features of the resilient component, such that one or more datum features of the resilient component share a common datum with the datum attachment features of the temporary reinforcement structure; and attaching the temporary reinforcement structure to the resilient component such that the temporary reinforcement structure rigidly supports the resilient component.

A fourth aspect of the invention provides the rigid temporary reinforcement structure of the second aspect releasably attached to the resilient component of the first aspect.

A resilient component is a component that is flexible/pliable relative to the rigid reinforcement structure, and that is able to spring back into shape after any flexing or bending that occurs.

A temporary reinforcement structure is a structure typically used to temporarily reinforce a resilient component during assembly of the resilient component to an assembly structure. Temporary means that the reinforcement structure is removed once the resilient component is installed. An example of a temporary reinforcement structure is a strongback, which supports a structure or assembly during any subsequent machining or assembly. The resilient component is thereby supported during assembly when the resilient component may otherwise exhibit an undesirable degree of flexibility prior to fixing into the assembly structure, at which point the assembly structure is able to support the resilient component. An assembly structure is an assembly able to carry structural loads.

By providing a resilient component and a temporary reinforcement structure that are accurately positioned and attached together with aligned datum features, such that they have a common datum through their respective connections at the datum attachment features, the reinforcement aspect of the temporary reinforcement structure can be supplemented by a number of auxiliary features, such as robot end effectors, photogrammetry targets, and magnetic through-thickness sensors. These features may be permanently or temporarily attached to the temporary reinforcement structure. These features can be easily attached to the temporary reinforcement structure, without any modification to the resilient component other than the provision of datum attachment features to attach to the temporary reinforcement structure, whilst being able to use the datum system of the resilient component due to the common datum. This datum system acts as a global reference system for the assembly structure.

These features can help to increase the rate of manufacture. For example, aircraft wing rib installation is a labour intensive task that can be significantly simplified to increase the rate at which aircraft can be built. In particular, these features allow automation of the installation, for example automated positioning and/or automated drilling. The features also increase accuracy of the assembly, reduce operator injury risk, and reduce the potential for damage to the parts during assembly and the subsequent costs associated with any rework.

A further aspect of the invention provides a method of assembling a resilient component in a structural assembly, comprising attaching a temporary reinforcement structure to the resilient component; positioning the resilient component in an assembly position by manipulating the rigid temporary reinforcement structure to a desired position; and joining the resilient component to a structural assembly using the datum features of the resilient component whilst the resilient component is rigidly supported by the temporary reinforcement structure.

There is a known relationship between the position of the resilient component and the temporary reinforcement structure due to their common datum system, such that the temporary reinforcement structure can be used to guide the positioning of the resilient component during assembly.

Optionally, wherein the one or more datum attachment features comprise a master datum attachment feature and a clocking datum attachment feature for releasably attaching to a corresponding master datum attachment feature and a corresponding clocking datum attachment feature of the resilient component.

A master datum attachment feature is a datum feature that provides at least one fixed position between two objects. A clocking datum (also known as a timing datum) is a second datum feature that fixes the relative orientations of the two objects.

Optionally, wherein the one or more datum attachment features each comprises a datum hole for aligning with a corresponding datum hole of the resilient component and through which a pin is insertable to lock the relative positions of the temporary reinforcement structure and the resilient component.

Optionally, the rigid temporary reinforcement structure comprising one or more positioning targets arranged to be detected by a positioning device.

Optionally, the method of assembling a resilient component in a structural assembly further comprising: tracking a positioning target on the temporary reinforcement structure to determine a position of the resilient component relative to the structural assembly, moving the resilient component based on the tracked position into the assembly position.

As the temporary reinforcement structure and resilient component share a common datum, positioning targets attached to the rigid temporary reinforcement can also simultaneously function as positioning targets for the resilient component. If the temporary reinforcement structure and resilient component did not share a common datum then any positioning targets used in relation to the resilient component would need to be attached directly to the resilient component rather than the temporary reinforcement structure.

The positioning targets provide a number of advantages, particularly when automated in combination with a robot manipulator, such as real time tracking of the resilient component position in various degrees of freedom, dynamic communication/feedback between a positioning robot and a metrology system, recording/certification of the resilient component positioning data in a Manufacturing Execution System (MES). The positioning targets also mitigate the use of bespoke setting gauges for the assembly, and drill bars, which are themselves time-consuming and difficult to position accurately.

Optionally, wherein one or more of the positioning targets are photogrammetry targets, and the positioning device is a photogrammetry device configured to track the photogrammetry targets.

Optionally, the rigid temporary reinforcement structure comprises an attachment portion for supporting the resilient component with the temporary reinforcement structure.

The attachment portion allows the temporary reinforcement structure, and through it the resilient component, to be moved and manipulated from a connection point on the temporary reinforcement structure.

Optionally, wherein the attachment portion is a connector for attaching to a manipulator.

The manipulator may be a pneumatic manipulator that allows manual manipulation by a user, or an automatic manipulator.

Optionally, wherein the connector is a robot end effector.

This allows connection to a robot, enabling repeatability of, e.g., wing rib positioning with automation, thereby reducing the risk of human error and risk to an operator during assembly.

Optionally, the rigid temporary reinforcement structure comprises a computer and a robot arm connected to the resilient component via the robot end effector, wherein the computer is configured to receive information relating to the position of the resilient component from the photogrammetry device, and the robot arm is configured to move the resilient component based on the information received by the computer so as to position the resilient component in an assembly position for joining the resilient component to a structural assembly.

This allows the resilient component to be automatically moved based on the position of the photogrammetry targets on the temporary reinforcement structure.

Optionally, wherein one or more of the positioning targets is a through-thickness sensor for indicating a site to be drilled relative to the resilient component.

Optionally, the method of assembling a resilient component in a structural assembly further comprising: detecting a through-thickness sensor on the temporary reinforcement structure from a first side of the resilient component, determining a site to be drilled based on the detected through-thickness sensor, drilling the resilient component from the first side of the resilient component, wherein the temporary reinforcement structure is adjacent a second side of the resilient component opposite the first side.

By providing through-thickness sensors on the temporary reinforcement structure, the sensors can be positioned earlier in the assembly process. This prevents the need for the sensors to be placed manually after the resilient component is positioned in the assembly position. The temporary reinforcement structures may also be used to install more than one resilient component each, in which case each sensor may be used to guide the drilling of multiple holes with highly repeatable accuracy, and thereby mitigating user error. As an operator no longer needs to manually position the sensors after initial assembly of the parts, any risks of operator injury during installation are avoided.

The sensors may be permanently attached to the temporary reinforcement structure or held in a bespoke sensor holder such that the through-thickness sensors are fixedly attached to the temporary reinforcement structure and do not fall off. This saves a significant amount of time that would otherwise be spent retrieving the sensors.

Optionally, wherein the through-thickness sensors are magnetic through-thickness sensors.

Optionally, wherein the through-thickness sensor is offset from the site to be drilled. In particular, the sensor is offset from the axis of a hole to be drilled.

Optionally, wherein the resilient component is an aircraft structural component.

The invention is particularly applicable to the assembly of aircraft components, where high accuracy is desirable and/or where the assembly forms a closed section with limited access.

Optionally, wherein the aircraft structural component is a wing rib or a leading edge structure for an aircraft wing.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
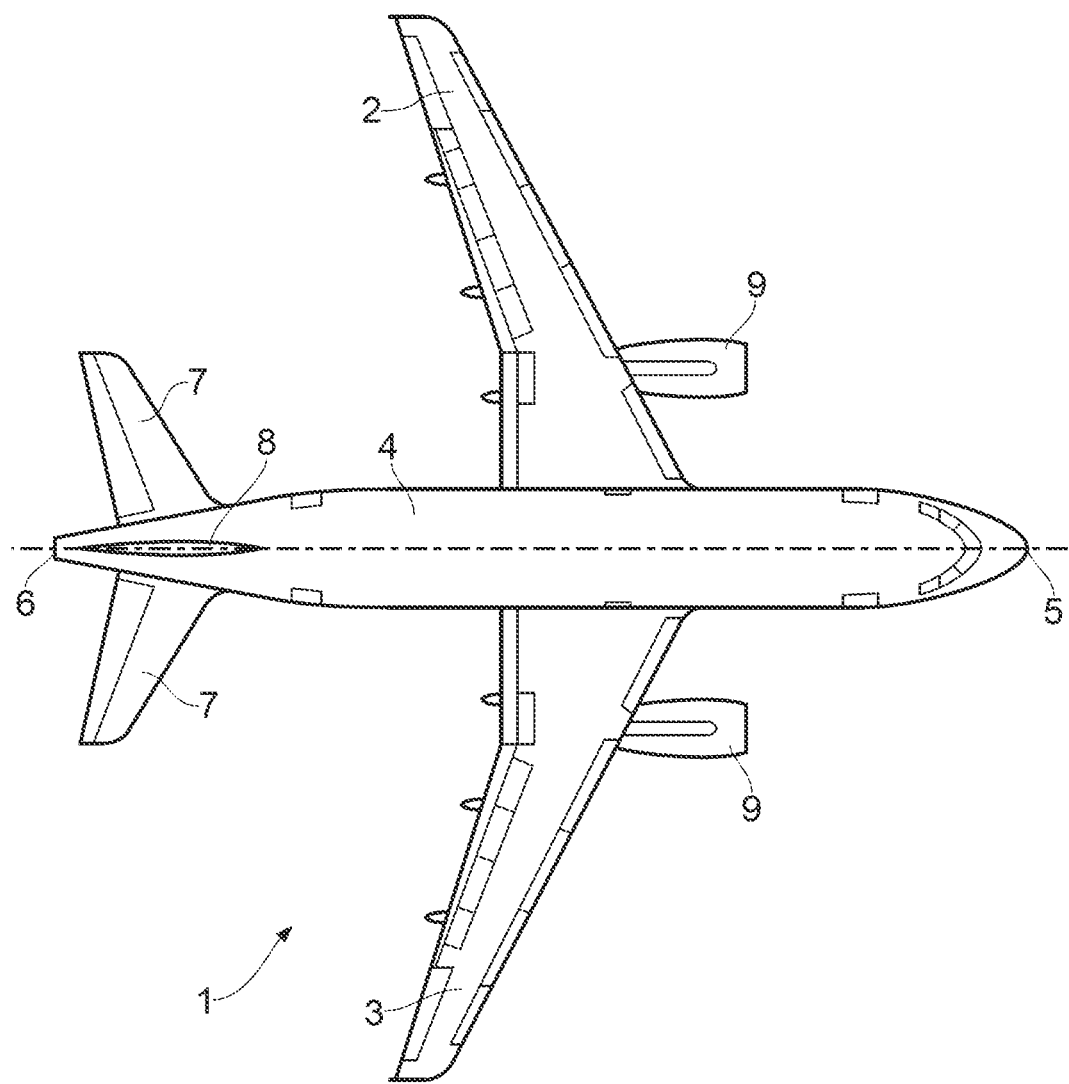
FIG. 1 shows a plan view of an aircraft.

FIG. 1 illustrates a typical fixed wing aircraft 1 having a port wing 2 and starboard wing 3 carrying wing mounted engines 9, the wings 2, 3 extending from a fuselage 4. The fuselage has a nose 5 and a tail 6 with horizontal and vertical stabiliser surfaces 7, 8 near the tail 6. The aircraft 1 is a typical jet passenger transonic transport aircraft but the invention is applicable to a wide variety of fixed wing aircraft types, including commercial, military, passenger, cargo, jet, propeller, general aviation, etc. with any number of engines attached to the wings or fuselage.

Each wing 2, 3 has a cantilevered structure with a length extending in a spanwise direction from a root to a tip, the root being joined to an aircraft fuselage 4. The wings 2, 3 are similar in construction so only the starboard wing 3 will be described in detail with reference to FIG. 2.

Figure 2:
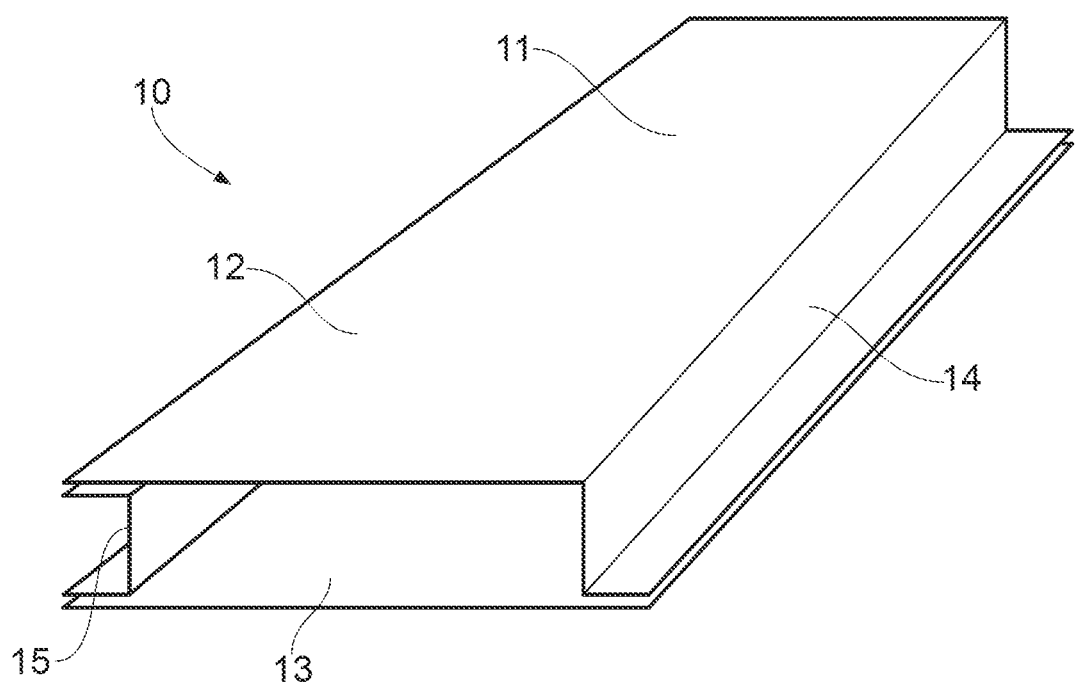
FIG. 2 shows a perspective view of the starboard wing box.

FIG. 2 illustrates a schematic view of the wing box 10 of the starboard wing 3 of the aircraft 1. As shown in FIG. 1, the wing 3 is tapered from the inboard root end of the wing 3 to the outboard tip end of the wing 3 such that the chord length of the wing 3 decreases from the inboard end to the outboard end. Correspondingly, the wing box 10 is also tapered. The wing box 10 is a support structure arranged to support a significant proportion of the loads on the wing 3. The wing box 10 has an integrated spar-cover 11, the spar-cover 11 being integrally formed from an upper cover 12 and a leading edge spar 14. The spar-cover 11 extends substantially the entire length of wing 3, from the wing root to the wing tip.

The spar-cover 11 is a monolithic structure having a fold axis between the upper cover 12 and leading edge spar 14 such that the material of the spar 14 extends continuously into the upper cover 12 through a fold region. The fold region extends substantially in the longitudinal direction of the spar-cover 11. The spar-cover 11 is substantially Z-shaped.

The leading edge spar 14 is a longitudinal spar extending in the spanwise direction of the wing 3, having a lower attachment flange attached to a lower cover 13.

Adjacent the trailing edge of the wing 3, a trailing edge spar 15 extends between the upper and lower cover panels 12, 13. The trailing edge spar 15 is substantially C-shaped, having upper and lower attachment flanges attaching to the upper cover 12 and lower cover 13, respectively.

The upper cover panel 12 and lower cover panel 13 have outer aerodynamic surfaces. The wing 3 also includes a leading edge structure (not shown) and a trailing edge structure (not shown) that are aerodynamically shaped to combine with the wing box 10 to form an aerofoil shaped body.

Figure 3:
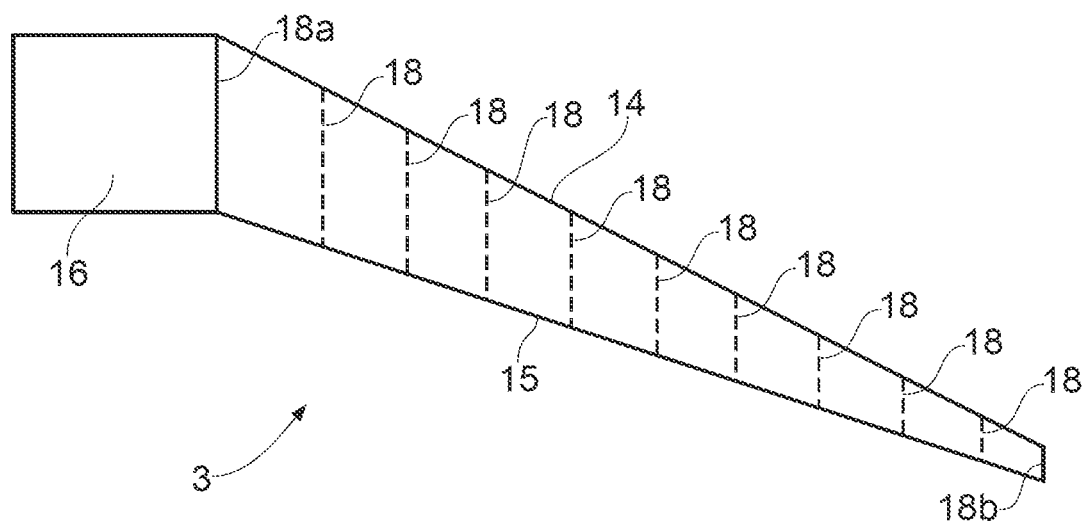
FIG. 3 shows a plan view of the starboard wing of the aircraft.

The covers 12, 13 may be reinforced with stringers. Stringers are spanwise extending reinforcing members attached to the inside of the covers 12, 13. The wing box 10 of the wing 3 also includes a plurality of chordwise ribs 18, 18a, 18b, as shown in FIG. 3, extending between the spars 14, 15 and between the covers 12, 13.

The aircraft 1 includes a centre wing box 16 within the body of the fuselage 4. The centre wing box 16 is joined to an inboard rib 18a proximate the root of the wing 3. The wing 3 includes a series of evenly spaced ribs 18 between the inboard rib 18a and an outboard rib 18b proximate the starboard wing tip.

Figure 4:
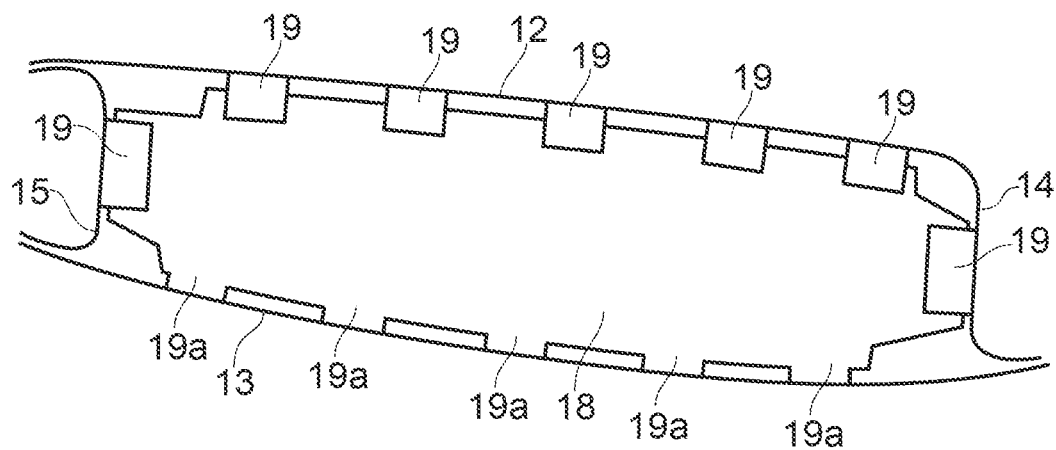
FIG. 4 shows a wing box structure at a rib location viewed in the spanwise direction.

FIG. 4 shows a rib 18 attached to the leading edge spar 14 and trailing edge spar 15 using brackets 19, 19a, as well as to the upper and lower skin covers 12, 13 using brackets 19. The brackets 19a attached to the lower cover 13 are integral brackets 19a, whilst all other brackets 19 are separate to the rib 18 and covers 12, 13 and spars 14, 15. In alternative examples, the brackets attaching to any of the covers 12, 13 or spars 14, 15 may be integral brackets 19a or separate brackets 19.

The rib 18 is designed to support the covers in forming the outer aerodynamic wing profile, in particular by transferring shear stresses through the rib 18 to the spars 14, 15 and other primary loading bearing structures of the wing box 10.

The rib 18 is typically designed with a view to minimising its weight, and as a consequence may be pliant such that it is able to flex and bend when not attached to the rib brackets 19, 19a and/or supported by the remaining structure of the wing box 10. Whilst the rib 18 is resilient, such that it is able to spring back into shape after any flexing or bending that occurs during assembly, any movement of the rib 18 during assembly makes alignment of the rib 18 into the wing box 10 more challenging during final assembly.

To support the rib 18 during assembly, a rigid temporary reinforcing structure, also known as a jig or strongback and henceforth referred to as a strongback, can be used. The strongback rigidly supports the rib 18, preventing any significant bending or flexing of the rib 18 during assembly. The strongback is attached to the rib 18, rigidly supporting the rib 18, so that the rib 18 can be moved into position. Accurate positioning of the rib 18 to the wing box 10 is facilitated using setting gauges, or similar positioning devices that determine the position and guide the positioning of the rib 18 in relation to the wing box 10. Once the rib 18 is in position, the rib 18 can be temporarily fastened in position using clamps and drill bars, and then fastened by the brackets 19, 19*a* or otherwise connected to the wing box 10. Subsequently, as the rib 18 is now supported by the wing box 10, the strongback can be removed from the rib 18.

Figure 5:
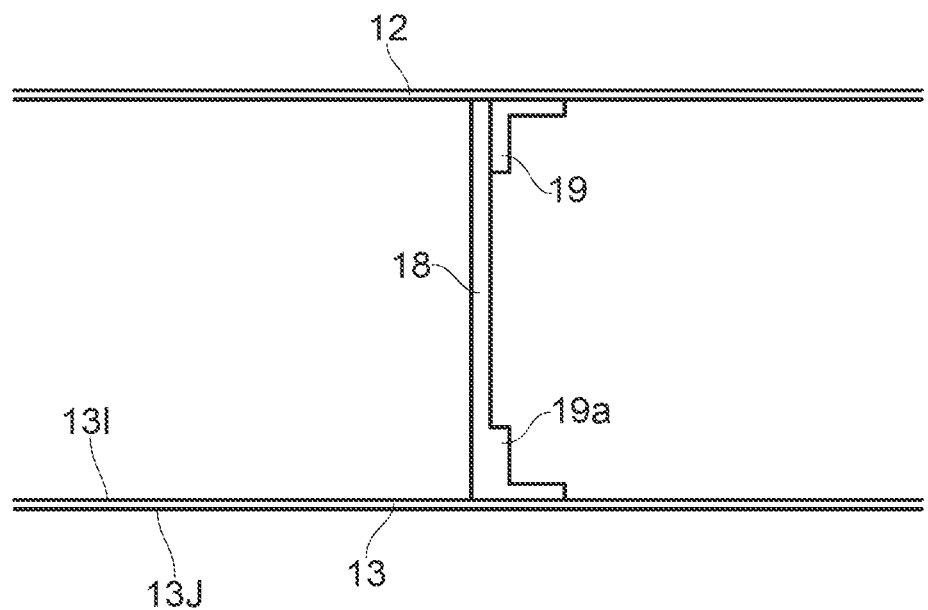
FIG. 5 shows the wing box structure at a rib location viewed in the chordwise direction.

In the assembled wing 3, the rib 18 is typically coupled to each of the leading edge spar 14, trailing edge spar 15, upper skin cover 12 and lower skin cover 13. The lower skin cover 13 is typically the last component to be attached to the wing 3, and in doing so the wing box structure forms a closed section with each rib 18 enclosed inside. Each spar 14, 15 and each skin cover 12, 13 thereby has an inner and an outer surface, with the lower wing skin cover 13 having an inner surface 131 and an outer surface 13J, as shown in FIG. 5.

Assembly of the lower wing cover 13 to each of the ribs 18 can be challenging, as access to the inside of the wing box structure, and in particular the rib brackets 19*a* and inner side 131 of the lower wing skin 13, is limited. As a result, a person may need to climb through the inside of the wing 3 so that a pilot hole can be drilled from the inside of the wing 3 at the correct location, or a device located outside the wing box 10 used in combination with a sensor inside the wing box 10 to indicate the site to be drilled in the rib 18. The pilot hole or sensor can then be used to guide a drill, or other tool, from the outside of the wing 3.

Installation of the ribs 18 into the wing box 10 represents one of the most time consuming tasks in aircraft assembly. This is further complicated by the particular integrated spar-cover 11 shown in FIGS. 2 and 3, which restricts access to the wing box 10 as it is not possible to separate the upper cover 12 from the leading edge spar 14 and provide access from the top of the wing box 10.

Figure 6:
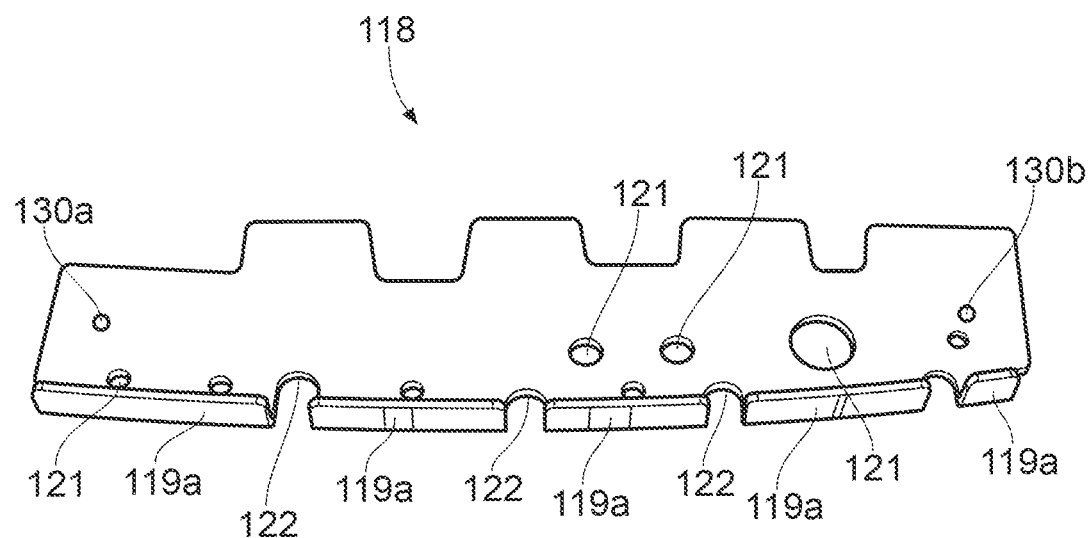
FIG. 6 shows a wing rib according to a first example.

FIG. 6 shows a first example of a rib according to the invention. The rib is substantially the same as the ribs described in relation to the previous Figures, and so similar reference numerals but numbered in the 100 series are used.

The rib 118 includes integral lower rib brackets 119*a* attached to the rib 118, such that the rib 118 and lower rib brackets 119*a* are formed as a single-piece, which are for attaching the rib 118 to the lower cover 13. The rib 118 is attached to the upper cover 12, and leading edge and trailing edge spars 14, 15 by separate rib brackets (not shown).

The ribs 118 also include mouse holes 122 adjacent the lower cover (not shown) that allow stiffeners (not shown) attached to the lower skin to extend through the ribs 118, and port holes 121 providing access between rib bays for systems and fuel flow.

The rib 118 includes a first datum hole 130*a* that is a first datum attachment feature for releasably attaching a strongback to the rib 118. The rib 118 includes a second datum hole 130*b* that is a second datum attachment feature for releasably attaching a strongback to the rib 118. The first and second datum attachment features 130*a*, 130*b* may each interchangeably be referred to as a master datum feature and a clocking/timing datum feature, wherein the master datum feature provides a fixed position between two objects and a clocking datum (also known as a timing datum) ensures the relative orientations of the two objects are also fixed. The first and second datum attachment features 130*a*, 130*b* share a common datum with datum features of the rib 118, for instance the edges of the rib 118.

In alternative examples, a single datum attachment feature may function as a master datum and a clocking datum simultaneously.

Figure 7:
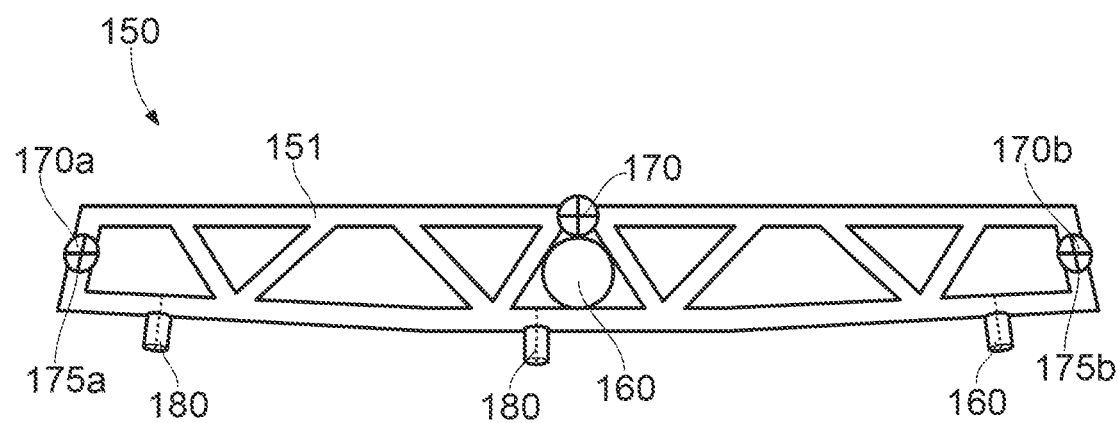
FIG. 7 shows a rigid temporary reinforcement structure according to a first example.

FIG. 7 shows a first example of a strongback 150 according to the invention, viewed towards an end face of the strongback 150.

The strongback 150 is a rigid temporary reinforcement structure configured to attach to the rib 118 and rigidly support the rib 118 when the rib 118 is not assembled into the wing box 10 and supported by the wing box 10, in particular the strongback 150 rigidly supports the rib 118 during assembly of the rib 118 to the spars 15, 14.

The strongback 150 includes a frame 151 providing the load bearing structure of the strongback and providing the structural rigidity configured to support the rib 118.

The strongback 150 includes an attachment portion 160 for externally connecting to the strongback 150 and allowing the position of the strongback 150 (and rib 118 when connected to the strongback) to be manoeuvred. In this particular example, the attachment portion 160 is a robot end effector for connecting to the robot arm of a robot, as will be discussed further in relation to FIG. 9.

Figure 10:
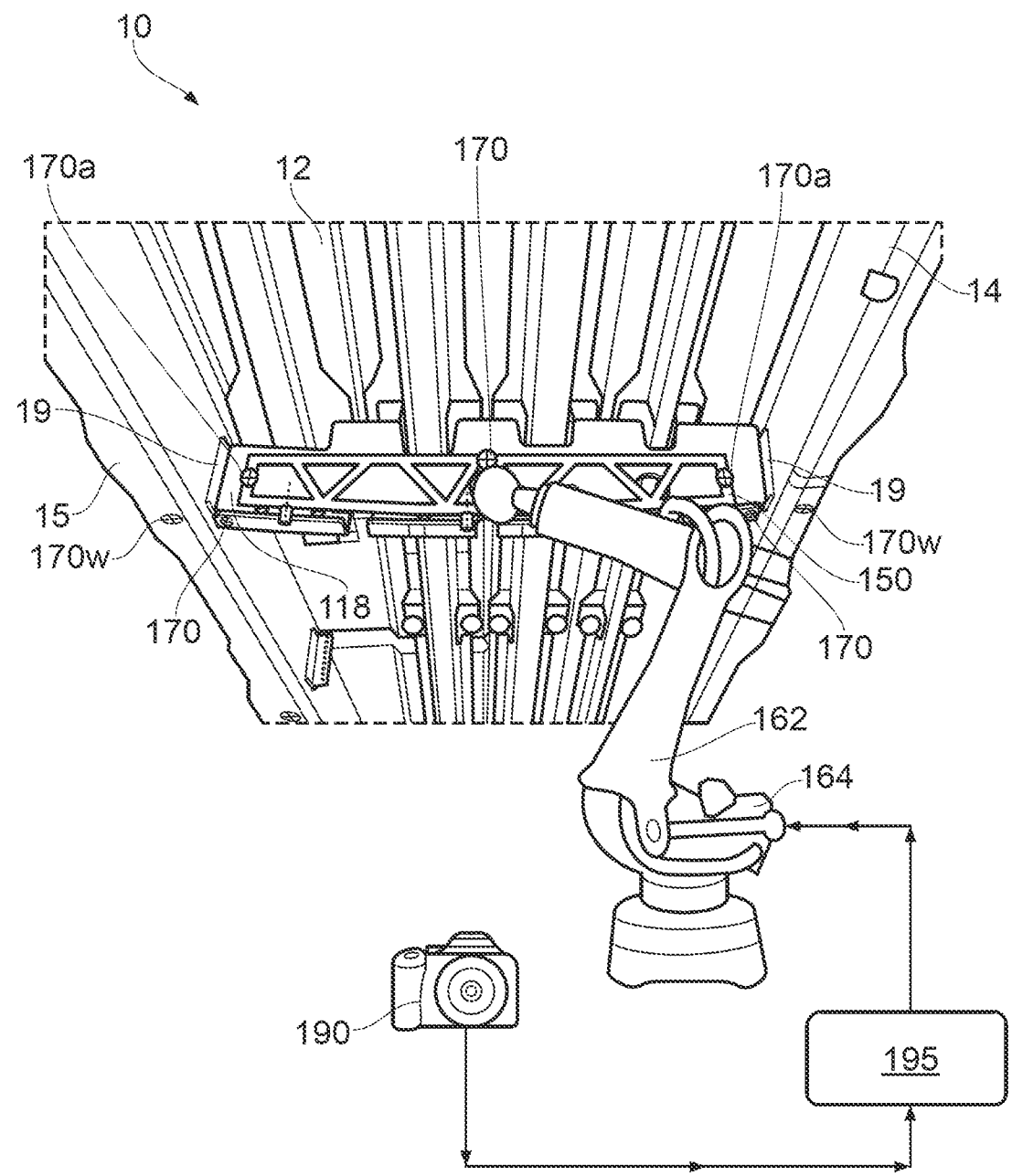
FIG. 10 shows the wing rib installed into the wing box.

The strongback 150 includes a plurality of positioning targets 170, 170*a*, 170*b* specifically photogrammetry targets 170, 170*a* that are arranged to be tracked by a photogrammetry camera (discussed in relation to FIG. 10).

Photogrammetry involves the recording and subsequent processing of photographic images to track an object. The photogrammetry targets 170, 170*a*, 170*b* are embedded on the strongback 150, allowing real time tracking of the strongback 150 to determine the position and orientation of the strongback 150.

The strongback 150 includes three photogrammetry targets 170, 170*a*, 170*b*, a central photogrammetry target 170 and two outer photogrammetry targets 170*a*, 170*b*. The outer photogrammetry targets 170*a*, 170*b* also function as locking pins 175*a*, 175*b* arranged to be inserted into the first and second datum holes 130*a*, 130*b* of the rib 118. The locking pins 175*a*, 175*b* define datum attachment features of the strongback 150. In alternative examples, the photogrammetry targets 170*a*, 170*b* may be separate to the locking pins 175*a*, 175*b*.

Attached to a lower edge of the strongback frame 151 are a series of integrated magnetic through-thickness sensors 180. The through-thickness sensors 180 are offset from the strongback 180 and arranged to be detected by a tracking device (not shown) that detects the magnetic field of the sensors 180, as will be discussed in further detail in relation to FIG. 9.

Figure 8:
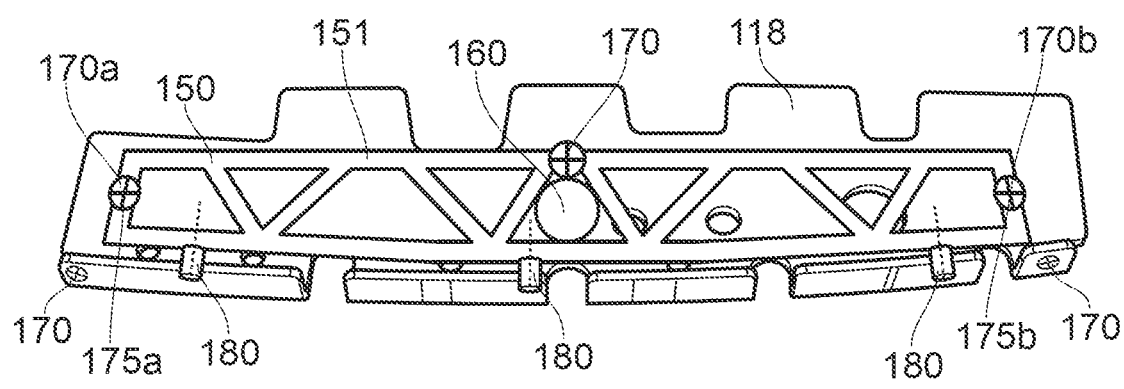
FIG. 8 shows the wing rib and rigid temporary reinforcement structure of the first examples connected at corresponding datum attachment features.

FIG. 8 shows the strongback 150 attached to a rib 118, such that the rib 118 is rigidly supported.

To attach the strongback 150 to the rib 118, the datum holes 130*a*, 130*b* are aligned with the locking pins 175*a*, 175*b* of the outer photogrammetry targets 170*a*. Inserting the locking pins 175*a*, 175*b* into the datum holes 130*a*, 130*b* of the ribs 118 locks together the strongback 150 and the rib 118, such that their positions are fixed relative to each other.

By connecting respective datum attachment features 130a, 130b, 175a, 175b of the rib 118 and strongback 150, the rib 118 and strongback 150 share a common datum system. In other words, the position of the strongback 150 relative to the rib 118 is known, such that information relating to the position and orientation of the strongback 150 inherently provides information relating to the position of the rib 118.

In this way, if the position of the strongback 150 is known in real-time then the strongback 150 can be used to accurately position the rib 118 to which it is releasably attached.

Figure 9:
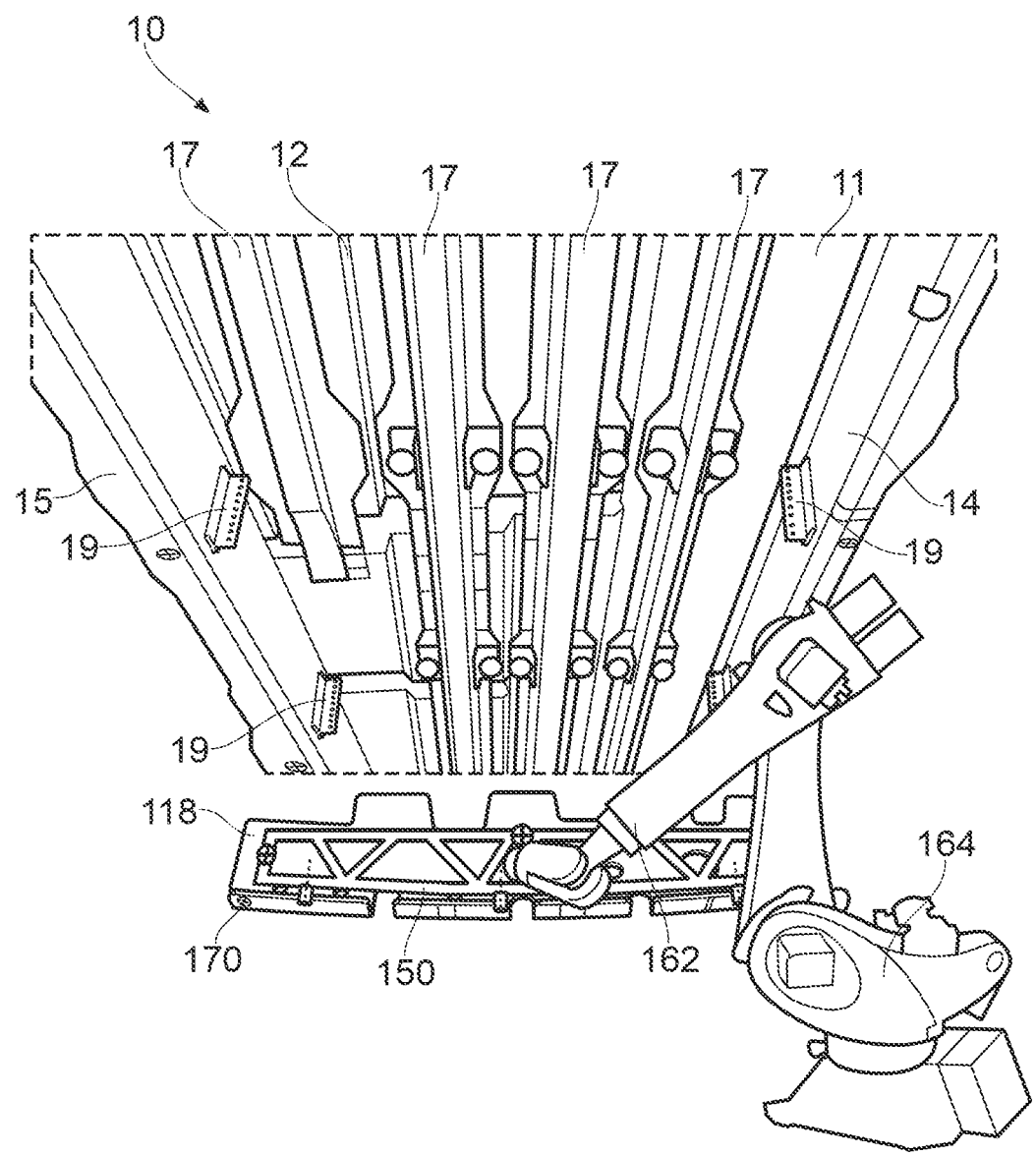
FIG. 9 shows the wing rib suspended below a wing box by a robot.

In one example shown in FIG. 9, the assembly of a rib 118 into a wing box 10 is facilitated by tracking the photogrammetry targets 170, 170a, 170b of the strongback 150.

The wing box 10 includes the integrated spar-cover 11, formed from the upper cover 12 and leading edge spar 14, the trailing edge spar 15, and a number of spanwise stringers 17 extending along the upper cover 12. The lower cover 13 is not attached, thereby providing access to the inside of the wing box 10 for the insertion of ribs 118.

FIG. 9 shows the rib 118 attached to the strongback 150, wherein the robot end effector 160 of the strongback 150 is connected to the robot arm 162 of a robot 164. The rib 118 is thereby able to be suspended below the wing box 10 by the robot 164.

As the datum features (such as the edges of the rib 118) and the datum attachment features 130a, 130b of the rib 118 share a common datum, and the datum attachment features 175a, 175b of the strongback 150 share that common datum via their connection to the datum attachment features 130a, 130b of the rib 118, the photogrammetry targets 170, 170a on the strongback 150 can be tracked by a photogrammetry device in order to position the rib 118 in a desired position, as will be explained in relation to FIG. 10.

FIG. 10 shows the robot 164 connected to a positioning device 190. The positioning device 190 is a photogrammetry camera that records images of the photogrammetry targets 170, 170a on the strongback 150 and photogrammetry targets 170w on the leading edge and trailing edge spars 14, 15. The images are used to track the relative positions of the photogrammetry targets 170, 170a, 170w.

The images are transferred to a computer 195 connected to the photogrammetry camera 190. The computer 195 processes the information received from the photogrammetry camera 190 in order to determine the position of the strongback 150 in relation to the wing box 10, and thereby determine the position of the rib 118 in relation to the rib brackets 19 of the wing box 10.

The photogrammetry camera 190 sends live data to the computer 195 so that an accurate and up-to-date position of the rib 118 and each rib bracket 19 is available. The position of the photogrammetry targets 170, 170a, 170w is thereby tracked live, providing simultaneous tracking information relating to the rib 118 and brackets 19 to the computer 195.

The computer 195 sends a control signal to the robot 164 based on the processed information. The control signal represents a command that instructs the robot 164 to move the rib 118, via the robot arm 162 and strongback 150, until it is positioned in an assembly position adjacent the rib brackets 19. This avoids the need for conventional setting tools, such as clamps and drill bars.

Once the rib 118 is positioned in the assembly position adjacent the rib brackets 19, as shown in FIG. 10, the rib 118 can be attached to the rib brackets 19, for example using fasteners (not shown).

The lower cover 13 is typically the last component of the wing box 10 to be assembled, and in doing so the wing box structure forms a closed section with each rib 118 enclosed inside.

As a result of the closed section formed when the lower cover 13 is attached, attachment of the lower cover 13 to each rib 118 can be challenging as access to the inside of the wing box structure, and in particular the rib brackets 19 and inner face of the lower wing skin 13, is limited. Consequently, a sensor device may be used in combination with one or more sensors 180 that are fitted to the inside the wing box 10. The sensors 180 can then each be used to guide a drill, or other tool, from the outside of the wing box 10.

Previously, in order to install and/or remove the sensors 180 from inside the wing box, a person may be needed to climb through the inside of the wing box 10 to manually position the sensors 180. These sensors 180 are used to indicate a site to be drilled from the outer face 13J of the lower cover 13 towards the inner face 131 of the lower cover 13, so that the hole through the lower cover 13 is in alignment with a target location on the rib brackets 119, for instance a fastener hole on the rib brackets 119. The sensors 180 may be placed at the target location or offset a known distance from the target location.

As the sensors 180 are not left inside the wing box 10 after assembly/machining, the sensors are removably attached to the wing box 10. Prior to removal of the sensors 180, the sensors 180 may fall off.

It is important that the sensors 180 are not left inside the wing box 10 after assembly, and so each sensor 180 needs to be accounted for. If one or more sensors 180 are misplaced within the wing box 10, a significant amount of effort may be required to find and remove them.

To mitigate this problem, the sensors 180 can be attached directly to the strongback 150. For example, the sensors 180 may be placed into a sensor holder 182 that carries a sensor 180 and prevents the sensor 180 from falling off during assembly of the wing box 10. The sensors 180 may be permanently attached to the strongback 150 and/or sensor holder 182.

Figure 11A:
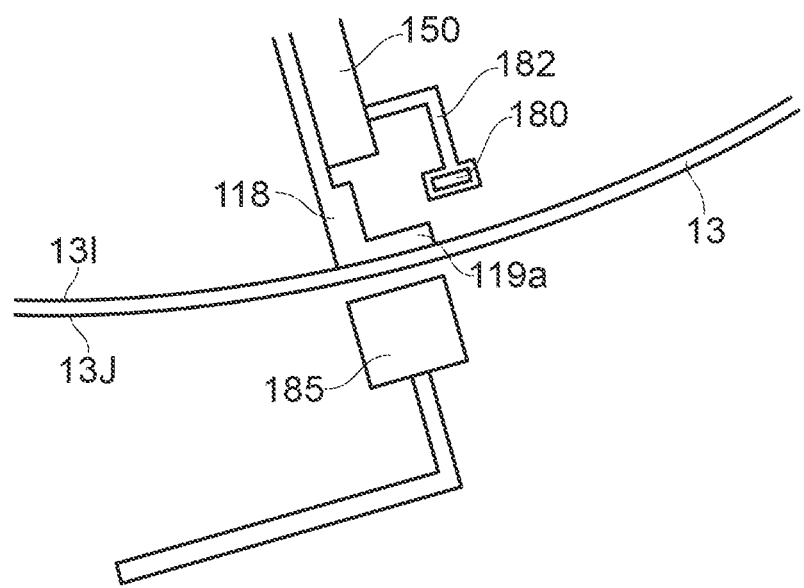
FIG. 11A shows a sensor device detecting a through-thickness sensor.

The sensors 180 are magnetic through-thickness sensors which are detected by a sensor device 185 located adjacent an opposite side of the lower cover 13 to the sensors 180 (i.e. adjacent the outer face 13J of the lower cover 13) as shown in FIG. 11A.

Figure 11B:
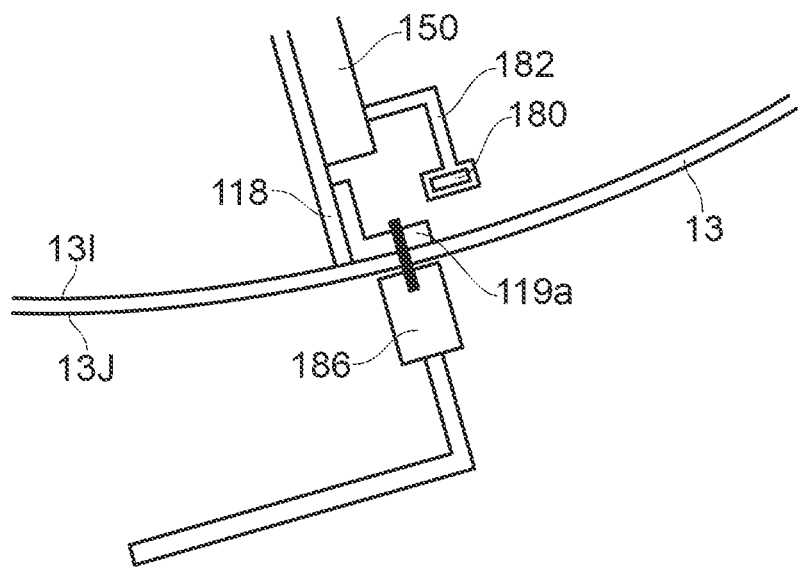
FIG. 11B shows a drilling tool drilling into the lower cover.

The sensor device 185 is moved adjacent the outer face 13J of the lower cover 13 in order to track the location of the sensor 180. A drill site is determined on the lower cover 13 based on the location of the sensor 180. In FIG. 11B the sensor location is offset from the drill site, although in alternative examples the drill site may be co-axial with the sensor 180.

A drilling tool 186, as shown in FIG. 11B, is then moved to the drill site to drill a hole in the lower cover 13 so that a fastener can be inserted into the hole to fasten the lower cover 13 to the rib bracket 119a.

It will be clear to the skilled person that the example of a temporary reinforcement structure 150 (alternatively referred to as a strongback) used to support an aircraft wing rib 118 is only one specific example, and that alternative examples of temporary reinforcement structures will be apparent to the skilled person. For instance, the leading edge structure of a wing 2, 3 typically requires a temporary reinforcement structure during assembly.

Figure 12A:
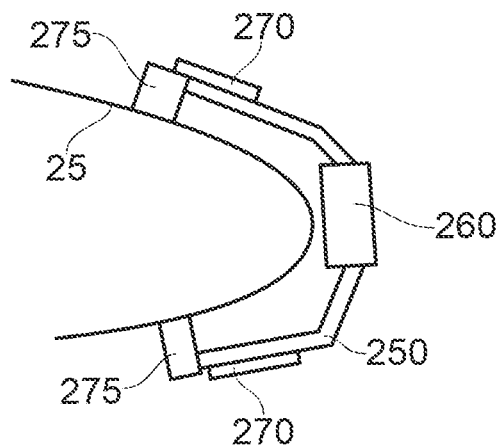
FIG. 12A shows a leading edge structure supported by a rigid temporary reinforcement structure according to a second example.

FIG. 12A shows an example of a leading edge wing structure 25 supported by a second example of a strongback. The strongback is substantially the same as the strongback described in relation to the previous Figures, and so similar reference numerals but numbered in the 200 series are used.

The strongback 250 includes a robot end effector 260 for connecting the strongback 250 to the robot arm of a robot (not shown), thereby allowing the strongback 250 (and leading edge structure 25 when connected to the strongback 250) to be manoeuvred and manipulated.

The strongback 250 is attached to the leading edge structure 25 at datum attachment features 275 of the strongback 250, which attach to corresponding datum attachment features (not shown) of the leading edge structure 25.

Figure 12B:
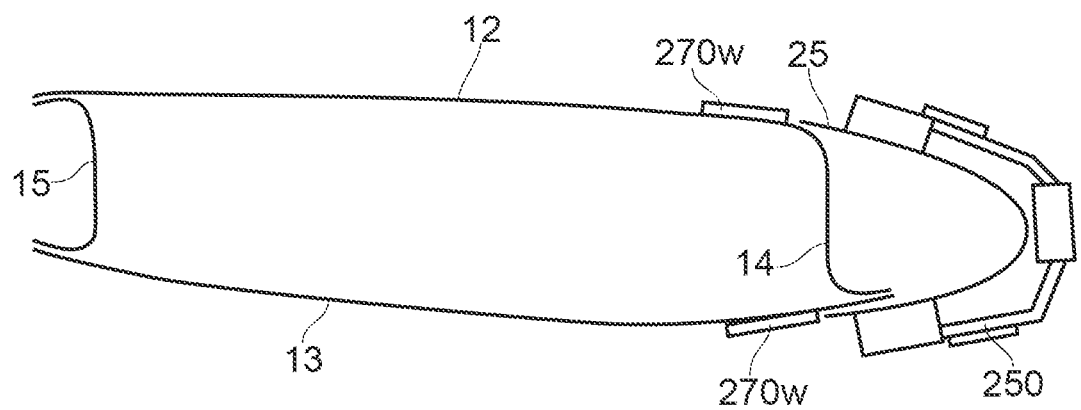
FIG. 12B shows the leading edge structure assembled to a wing box.

By connecting the datum attachment features 275 of the strongback 250 and leading edge structure 25, the leading edge structure 25 and strongback 250 share a common datum system, as similarly described in relation to the previous example of a rib 118 supported by a strongback 150, such that the strongback 150 can be used to accurately position the leading edge structure 25 relative to a wing box 10—as shown in FIG. 12B.

The strongback 250 includes photogrammetry targets 270 that can be tracked by a photogrammetry device. The wing box 10 includes photogrammetry targets 270w that can be tracked by the same photogrammetry device. The photogrammetry targets 270, 270w allow the relative positions of the leading edge structure 25 and wing box 10 to be tracked such that the leading edge structure 25 can be accurately positioned in an assembly position relative to the wing box 10.

It will be clear to the skilled person that the examples described above may be adjusted in various ways.

In alternative examples, the second example of a strongback 250 may include sensors similar to those used in relation to the first example discussed in relation to FIGS. 6 to 11. The sensors can be used to indicate a site to be drilled in the wing box 10 and/or leading edge structure 25 from the outer side of the wing box 10 towards the inner side.

The strongback 150, 250 is described in relation to its used in assembling a rib 118 or leading edge structure 25 to a wing box 10. It will be apparent to the skilled person that the strongback may be used to support other resilient components that may require support during assembly. The invention is particularly applicable to the assembly of aircraft components, where high accuracy is desirable, but is not so limited and may be applied to the assembly of any suitable components.

The sensors 180 are discussed in relation to their indication of a site to be drilled with a drilling tool, however the sensors may be used to direct other tools such as fastening tools or milling tools.

The photogrammetry targets are described in the context of them being discrete targets placed at discrete locations on the temporary reinforcement structure and the assembly component (e.g. the wing box 10). There may be any number of photogrammetry targets. Alternatively, there may be one photogrammetry target on each component that spans a sufficient portion of each component.

In alternative examples, the targets may not be photogrammetry targets. The targets may be reflector targets detected by a laser or microwave sensor device, or other suitable positioning targets.

The strongback is described as having a robot end effector for connecting to the robot arm of a robot. In alternative examples, the strongback may comprise in addition or alternatively, a connector for a manipulator, such as a pneumatic manipulator and/or handles for manual movement of the resilient component. The strongback may be positioned manually using one or more of these features, whilst simultaneously positioning the resilient component using positioning targets, such as photogrammetry targets.

The sensors 180 are detected by detecting their magnetic field. In alternative examples, the sensors may be detected by other means. The sensors may comprise contrast materials configured to be detected by an x-ray backscatter emitter/detector device. Drill site positioning sensors, such as through-thickness sensors, may still be manually installed onto the rib (or other resilient structure) in addition to or instead of placing them on the strongback.

The wing box 10 is described as having an integrated spar-cover 11 formed as a single piece from an upper cover 12 and a leading edge spar 14, however it will be apparent that any suitable wing box construction may be used. In alternative examples, any combination of cover 12, 13 and spar 14, 15 may be formed as an integral spar-cover. The spars and covers may all be separate. The wing box may include a 'U' shaped single-piece component, formed by three of the upper and lower covers, and leading and trailing edge spars.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A rigid temporary reinforcement structure for attachment to a resilient component, the temporary reinforcement structure having one or more datum attachment features for releasably attaching the temporary reinforcement structure to corresponding datum attachment features of the resilient component,
   where the datum attachment features and the datum features of the resilient component have a common datum, and the temporary reinforcement structure is configured to rigidly support the resilient component during assembly of the resilient component to a structural assembly, wherein the one or more datum attachment features comprise a master datum attachment feature and a clocking datum attachment feature for releasably attaching to a corresponding master datum attachment feature and a corresponding clocking datum attachment feature of the resilient component.

2. A system comprising a rigid temporary reinforcement structure according to claim 1 and a resilient component attached to the rigid temporary reinforcement structure, the resilient component having:
   one or more datum attachment features; and
   one or more datum features,
   wherein the one or more datum attachment features and the one or more datum features of the resilient component have a common datum,
   wherein the one or more datum attachment features of the resilient component are releasably attached to the one or more datum attachment features of the rigid temporary reinforcement structure, such that the rigid temporary reinforcement structure rigidly supports the resilient component for assembly of the resilient component to a structural assembly.

3. A rigid temporary reinforcement structure according to claim 1, wherein the one or more datum attachment features each comprises a datum hole for aligning with a corresponding datum hole of the resilient component and through which a pin is insertable to lock the relative positions of the temporary reinforcement structure and the resilient component.

4. A rigid temporary reinforcement structure according to claim 1, comprising an attachment portion for supporting the resilient component with the temporary reinforcement structure.

5. A rigid temporary reinforcement structure for attachment to a resilient component, the temporary reinforcement structure having one or more datum attachment features for releasably attaching the temporary reinforcement structure to corresponding datum attachment features of the resilient component, where the datum attachment features and the datum features of the resilient component have a common datum, and the temporary reinforcement structure is configured to rigidly support the resilient component during assembly of the resilient component to a structural assembly, comprising one or more positioning targets arranged to be detected by a positioning device, and a frame providing a load bearing structure of the rigid temporary reinforcement structure, and wherein the one or more of the positioning targets are embedded in the frame.

6. A rigid temporary reinforcement structure according to claim 5, wherein one or more of the positioning targets are photogrammetry targets, and the positioning device is a photogrammetry device configured to track the photogrammetry targets.

7. A rigid temporary reinforcement structure according to claim 6, comprising an attachment portion for supporting the resilient component with the temporary reinforcement structure, wherein the attachment portion is a connector for attaching to a manipulator, and wherein the connector is a robot end effector, and further comprising a computer and a robot arm connected to the resilient component via the robot end effector, wherein the computer is configured to receive information relating to the position of the resilient component from the photogrammetry device, and the robot arm is configured to move the resilient component based on the information received by the computer so as to position the resilient component in an assembly position for joining the resilient component to a structural assembly.

8. A rigid temporary reinforcement structure according to claim 5, wherein one or more of the positioning targets is a through-thickness sensor for indicating a site to be drilled relative to the resilient component.

9. A rigid temporary reinforcement structure according to claim 8, wherein the through-thickness sensors are magnetic through-thickness sensors.

10. A rigid temporary reinforcement structure according to claim 8, wherein the through-thickness sensor is offset from the site to be drilled.

11. A rigid temporary reinforcement structure for attachment to a resilient component, the temporary reinforcement structure having one or more datum attachment features for releasably attaching the temporary reinforcement structure to corresponding datum attachment features of the resilient component, where the datum attachment features and the datum features of the resilient component have a common datum, and the temporary reinforcement structure is configured to rigidly support the resilient component during assembly of the resilient component to a structural assembly, and an attachment portion for supporting the resilient component with the temporary reinforcement structure, wherein the attachment portion is a connector for attaching to a manipulator.

12. A rigid temporary reinforcement structure according to claim 11, wherein the connector is a robot end effector.

* * * * *